(12) United States Patent
Okazawa et al.

(10) Patent No.: US 8,701,240 B2
(45) Date of Patent: Apr. 22, 2014

(54) LENS CLEANING MECHANISM, PROJECTION LENS, AND PROJECTION TYPE DISPLAY DEVICE

(75) Inventors: Shunsuke Okazawa, Tokyo (JP); Takayuki Okada, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 393 days.

(21) Appl. No.: 12/737,813

(22) PCT Filed: Aug. 22, 2008

(86) PCT No.: PCT/JP2008/065001
§ 371 (c)(1),
(2), (4) Date: Feb. 18, 2011

(87) PCT Pub. No.: WO2010/021056
PCT Pub. Date: Feb. 25, 2010

(65) Prior Publication Data
US 2011/0141562 A1 Jun. 16, 2011

(51) Int. Cl.
*B60S 1/02* (2006.01)
(52) U.S. Cl.
USPC ............. 15/250.17; 15/250.22; 359/508
(58) Field of Classification Search
USPC .......... 15/250.001–250.003, 250.12, 250.13, 15/250.16, 250.17, 250.22, 250.23, 15/250.29, 250.351, 250.43–250.48, 15/250.5; 359/507–508
See application file for complete search history.

(56) References Cited

U.S. PATENT DOCUMENTS

| | | | | |
|---|---|---|---|---|
| 3,659,307 A * | 5/1972 | Vitou | | 15/250.01 |
| 3,736,617 A * | 6/1973 | Ahlen | | 15/250.22 |
| 3,840,934 A * | 10/1974 | Bird | | 15/250.3 |
| 3,902,218 A * | 9/1975 | Bryant | | 15/250.22 |
| 5,208,938 A | 5/1993 | Webb | | |
| 6,827,093 B2 * | 12/2004 | Muster et al. | | 134/153 |

FOREIGN PATENT DOCUMENTS

| | | |
|---|---|---|
| JP | 4-306077 A | 10/1992 |
| JP | 2003-228127 A | 8/2003 |
| JP | 2006-171169 A | 6/2006 |
| JP | 2006-220835 A | 8/2006 |
| JP | 2007-312062 A | 11/2007 |
| JP | 2008-32932 A | 2/2008 |

* cited by examiner

*Primary Examiner* — Stephone B Allen
*Assistant Examiner* — James McGee
(74) *Attorney, Agent, or Firm* — McGinn IP Law Group, PLLC

(57) ABSTRACT

A lens cleaning mechanism according to the present invention comprises: a cleaning unit (1a) that covers a standby area being a part of the surface of a front lens element (11), as the standby area is pressed, the cleaning unit (1a) being rotationally moved along the surface of the front lens element (11) to slide over the entire surface of the front lens element (11), including a remaining part of the surface and the standby area; a drive unit (3) connected to a holding member (1b); and a control unit (2) for rotationally moving the cleaning unit (1a) by driving the drive unit (3).

11 Claims, 8 Drawing Sheets

(a)     (b)

(c)

(b)

(a)

LENS CLEANING MECHANISM, PROJECTION LENS, AND PROJECTION TYPE DISPLAY DEVICE

TECHNICAL FIELD

The present invention relates to a lens cleaning mechanism, a projection lens, and a projection type display device.

BACKGROUND ART

In recent years, the use of projection type display devices has become widespread, and in addition to their installation in conference rooms or the like for use in presentations and the like, they are increasingly installed for use in an environment where there are a lot of dust particles or the like such as stores, outdoors, etc. For projection type display devices installed in an environment where there are a lot of dust particles or the like, dust particles or the like sometimes adhere to the surface of the projection lens (i.e., the surface of a lens disposed at the front most part in a plurality of lenses of the projection lens). When dust particles or the like adhere to the surface of the projection lens, a reduction in brightness or variations in brightness occur in images projected by projection type display devices.

A cover is disposed on a projection lens to prevent dust particles or the like from adhering to the surface of the projection lens when projection type display devices are not used. However, when projection type display devices are installed in an environment where there are a lot of dust particles or the like, a lot of dust particles or the like adhere to the surface of the projection lens that is being used. Consequently, it is necessary for such projection type display devices to have a mechanism for cleaning the surface of the projection lens that is being used.

First, as a first lens cleaning mechanism, non-contact type lens cleaning mechanisms in which a cleaning unit is not directly contacted with a lens will be described.

For non-contact type lens cleaning mechanisms, for example, there is one mechanism in which a cleaning unit blows air to a lens surface and blows off and removes dust particles or the like adhering to the lens surface during the cleaning operation. In projection type display devices having a non-contact type lens cleaning mechanism, since the cleaning unit does not obstruct the surface of a projection lens even when a cleaning operation is performed during the projection of images, there is an advantage in that the cleaning operation does not affect the images to be projected.

JP2003-228127A describes a non-contact type lens cleaning mechanism in which a cleaning unit blows air to a lens surface during a cleaning operation. This lens cleaning mechanism comprises an air filter for removing dust particles or the like contained in the air, wherein the air filter is configured such that air that has passed through the air filter is blown to the lens surface. In this lens cleaning mechanism, this makes it possible to prevent dust particles or the like contained in the air from adhering to the lens surface during the cleaning operation.

However, in this lens cleaning mechanism, although large dust particles or the like adhering to the lens surface with a weak force such as static electricity can be removed, it is difficult to remove micro dust particles adhering to the lens surface or dust particles or the like containing moisture. Furthermore, it is particularly difficult to remove oily dust particles or the like.

As described above, since projection type display devices having a non-contact type lens cleaning mechanism have insufficient power to remove the dust particles or the like adhering to the surface of the projection lens, sometimes the occurrence of a reduction in brightness or variations in bright of the images to be projected cannot be sufficiently prevented.

Next, as a second cleaning mechanism, contact type lens cleaning mechanisms in which a cleaning unit is directly contacted with a lens will be described.

In contact type lens cleaning mechanisms, a cleaning unit having felt or the like is brought into direct contact with the lens surface to apply mechanical force to dust particles or the like adhering to the lens surface for removing the dust particles or the like. For this purpose, contact type lens cleaning mechanisms have a strong force to remove the dust particles or the like adhering to the lens surface, and can remove even micro dust particles, dust particles containing moisture, and oily dust particles or the like.

JP2006-220835A describes a contact type lens cleaning mechanism having a configuration similar to a windshield wiper that wipes away raindrops on the automobile windshield. This lens cleaning mechanism comprises a wiper, as a cleaning unit, that is a rod-shaped wiping structure, one end of which is rotatably supported by a lens frame that holds a lens.

In this lens cleaning mechanism, a drive system reciprocatingly moves the wiper along the lens surface in the state in which the wiper is pressed against the lens surface. Thus, the wiper wipes away dust particles or the like adhering to the lens surface.

However, in projection type display devices having this lens cleaning mechanism, when the cleaning operation is performed during use of the device, the wiper obstructs the lens surface to affect the images to be projected. Therefore, in such contact type lens cleaning mechanisms, it is sometimes necessary to reduce the area of the cleaning unit that obstructs the lens surface or to reduce the number of times and the period of time during which the cleaning unit obstructs the lens surface during the cleaning operation.

Furthermore, since the lens surface is a curved surface, it is necessary for this lens cleaning mechanism to deform the wiper in accordance with the shape of the lens surface when the wiper reciprocates along the lens surface in order to wipe the whole lens surface. For deforming the wiper in accordance with the shape of the lens surface, it is necessary to form the wiper in a complicated configuration. Providing this kind of lens cleaning mechanism results in expensive costs.

Moreover, in this lens cleaning mechanism, it is necessary to provide space adjacent to the lens frame which allows the wiper to be retracted during times other than the time when the cleaning operation is performed. Therefore, the size of devices that are provided with this lens cleaning mechanism increases.

In addition, since only one end of the wiper is supported by the lens frame, the pressing force of the wiper against the lens surface is strong in the portion on one end side of the wiper, which is supported by the lens frame, whereas the force is weak in the portion on the other end side, which is not supported by the lens frame. Therefore, in this lens cleaning mechanism, variations in wipes tend to occur on the lens surface. The occurrences of variations in wipes on the surface of the projection lens of projection type display devices cause variations in brightness of images to be projected.

DISCLOSURE OF THE INVENTION

It is an object of the present invention to provide a lens cleaning mechanism, a projection lens, and a projection type display device that have improved performance for removing dust particles or the like adhering to a lens surface.

A lens cleaning mechanism according to the present invention comprises: a cleaning unit configured to cover a standby area being a part of the lens surface, as the standby area is pressed, the cleaning unit being rotationally moved along the lens surface to slide over the lens surface, including a remaining part of said lens surface and the standby area; a drive means connected to the holding member; and a control means for rotationally moving the cleaning unit by driving the drive means.

BEST MODE FOR CARRYING OUT THE INVENTION

Next, an embodiment of the present invention will be described with reference to the drawings.

Figure 1:
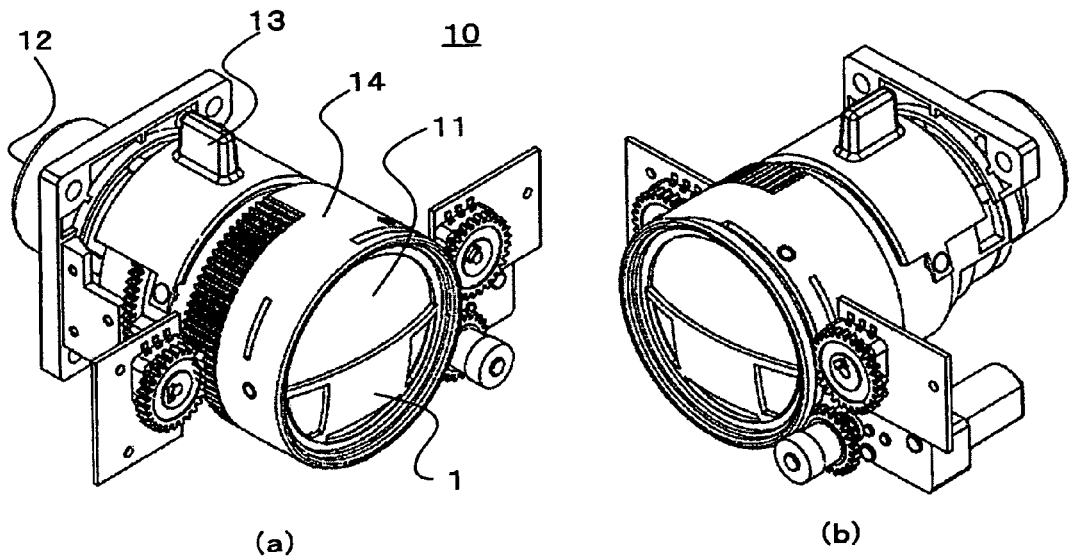
FIGS. 1(a) and 1(b) show perspective views of a projection lens having a lens cleaning mechanism according to an embodiment of the present invention.

FIG. 1 shows perspective views of a projection lens having a lens cleaning mechanism according to an embodiment of the present invention.

Projection lens 10 comprises front lens element 11 that is a lens disposed in the front most part, and rear lens element 12 that is a lens disposed in the rearmost part. Projection lens 10 projects images on a screen or the like by emitting image light, which is incident from rear lens element 12, from front lens element 11.

Moreover, projection lens 10 comprises zoom lever 13 and focus ring 14 for adjusting images to be projected. The size of an image projected by projection lens 10 is first adjusted by zoom lever 13, and then the focal point is adjusted by focus ring 14, whereby the image having an appropriate size is in proper focus.

The lens cleaning mechanism according to this embodiment comprises rotational cleaning plate 1 disposed on the surface side of front lens element 11. Front lens element 11 and rotational cleaning plate 1 are held by focus ring 14 that is a holding frame.

Figure 2:
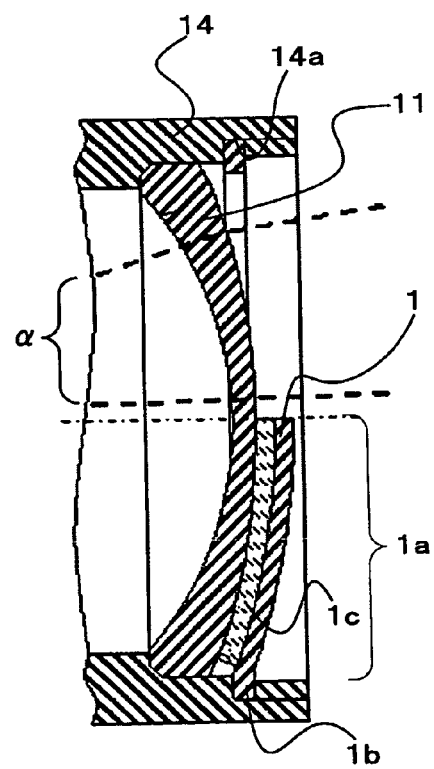
FIG. 2 is a cross sectional side view of the vicinity of a front lens element of the projection lens shown in FIG. 1.

FIG. 2 is a cross sectional side view of the vicinity of the front lens element of the projection lens shown in FIG. 1. Rotational cleaning plate 1 comprises cleaning unit 1a that covers a part of the surface of front lens element 11, and holding member 1b that is formed in a ring shape for holding cleaning unit 1a. The surface on the front lens element 11 side of cleaning unit 1a is covered with felt 1c, the surface being formed to match with the shape of the surface of front lens element 11, wherein felt 1c is pressed against the surface of front lens element 11.

Rotational cleaning plate 1 is supported on focus ring 14 by fitting holding member 1b to guide groove 14a that is formed along the inner circumference of focus ring 14. Holding member 1b of rotational cleaning plate 1 is slidable along guide groove 14a of focus ring 14, and by sliding holding member 1b with respect to focus ring 14, cleaning unit 1a can be rotationally moved over the surface of front lens element 11 about the optical axis of front lens element 11.

Front lens element 11 is a convex lens, and the surface of front lens element 11 is a rotationally symmetrical surface about the optical axis. Therefore, when cleaning unit 1a is rotationally moved about the optical axis of front lens element 11, it is held while felt 1c being pressed against the surface of front lens element 11. Consequently, rotational cleaning plate 1 is rotated to cause cleaning unit 1a to slide over the surface of front lens element 11, and felt 1c of cleaning unit 1a wipes away dust particles or the like adhering to the surface of front lens element 11.

Projection lens 10 is configured such that optical path $\alpha$, along which an image travels when the image is projected, passes through a portion disposed in the upper half of front lens element 11. Moreover, in FIG. 2, cleaning unit 1a of rotational cleaning plate 1 is placed at an initial position that is a first position at which cleaning unit 1a covers a standby area, the area being a portion disposed in the lower half of the surface of front lens element 11, through which optical path $\alpha$ does not pass. Consequently, in projection lens 10, in the case in which cleaning unit 1a is placed at the initial position, rotational cleaning plate 1 does not obstruct optical path $\alpha$ when projection lens 10 projects images.

Figure 3:
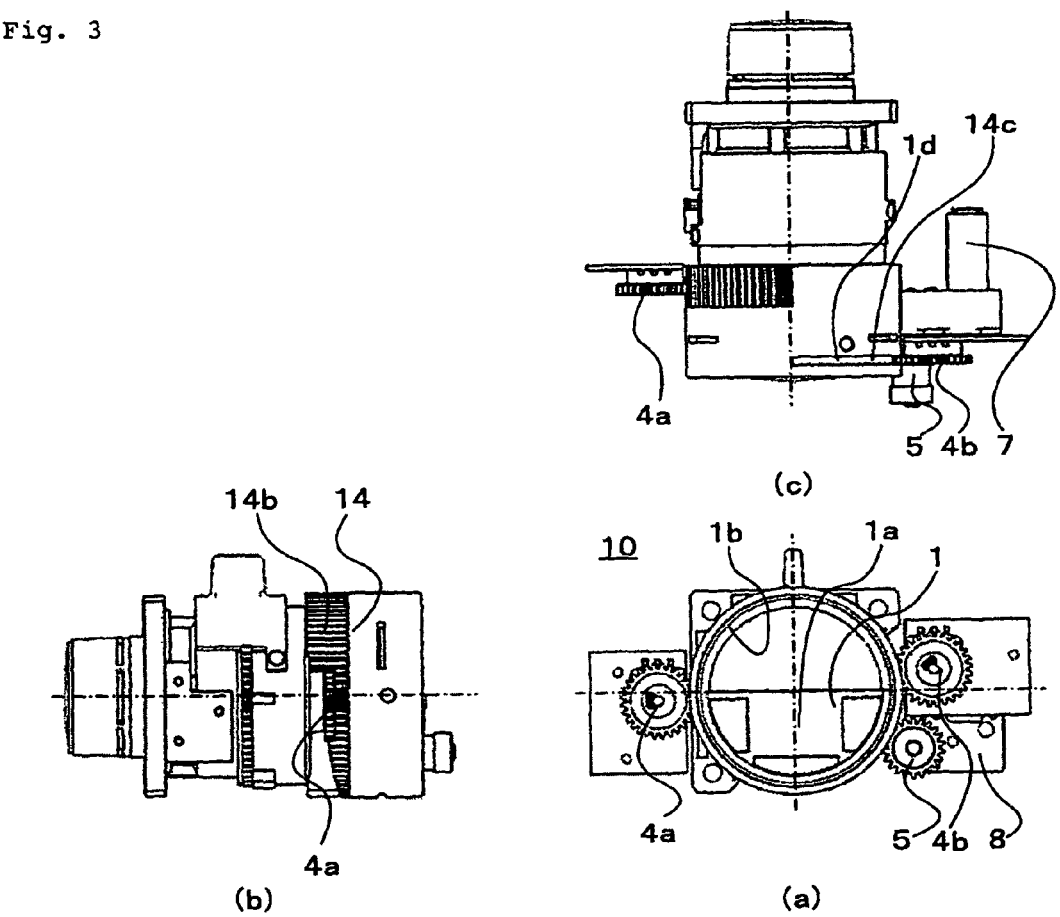
FIGS. 3(a), 3(b), and 3(c) respectively show a front view, a side view, and a top view of the projection lens shown in FIG. 1.

FIGS. 3(a), 3(b), and 3(c) are a front view, a side view, and a top view of the projection lens shown in FIG. 1, respectively. This lens cleaning mechanism comprises control unit 2 that is a control means for controlling the position of cleaning unit 1a (see FIG. 5, etc.). In the lens cleaning mechanism according to this embodiment, control unit 2 places cleaning unit 1a at the initial position during a standby state while waiting for the cleaning operation to be performed.

Control unit 2 comprises first potentiometer 4a that is a holding frame detecting unit, and second potentiometer 4b that is a cleaning unit detecting unit. Moreover, in control unit 2, a reference state is set in which the rotational position of focus ring 14 is at the set position and cleaning unit 1a of rotational cleaning plate 1 is placed at the initial position. First potentiometer 4a outputs a first detected value corresponding to an angle at which focus ring 14 is rotated with respect to the reference state, and second potentiometer 4b outputs a second detected value corresponding to an angle at which rotational cleaning plate 1 is rotated with respect to the reference state.

Moreover, the lens cleaning mechanism according to this embodiment comprises drive unit 3 that is a drive means for rotating rotational cleaning plate 1, wherein drive unit 3 comprises motor 7, reduction gear 8, and gear 5. In drive unit 3, the drive force by motor 7 is transferred to gear 5 through reduction gear 8 for rotating gear 5.

Teeth formed part 14b is formed on the outer circumference of focus ring 14, wherein teeth formed part 14b and teeth formed on first potentiometer 4a are engaged with each other. As a result, in first potentiometer 4a, first potentiometer 4a rotates, as it follows the rotation of focus ring 14, to output the first detected value corresponding to the rotational position of focus ring 14.

Furthermore, teeth formed part 1d is formed in the entire circumference of holding member 1b of rotational cleaning plate 1, and slit-shaped opening 14c is formed in a part of guide groove 14a of focus ring 14 along teeth formed part 1d. The individual teeth formed on second potentiometer 4b and on gear 5 and teeth formed part 1d are engaged with each other in the state in which second potentiometer 4b and gear 5 partially enter the inside of the opening 14b.

Accordingly, in second potentiometer 4b, second potentiometer 4b rotates, as it follows the rotation of rotational cleaning plate 1, to output the second detected value corresponding to the rotational position of rotational cleaning plate 1. In addition, gear 5 is rotated to turn rotational cleaning plate 1 as it follows gear 5.

Figure 5:
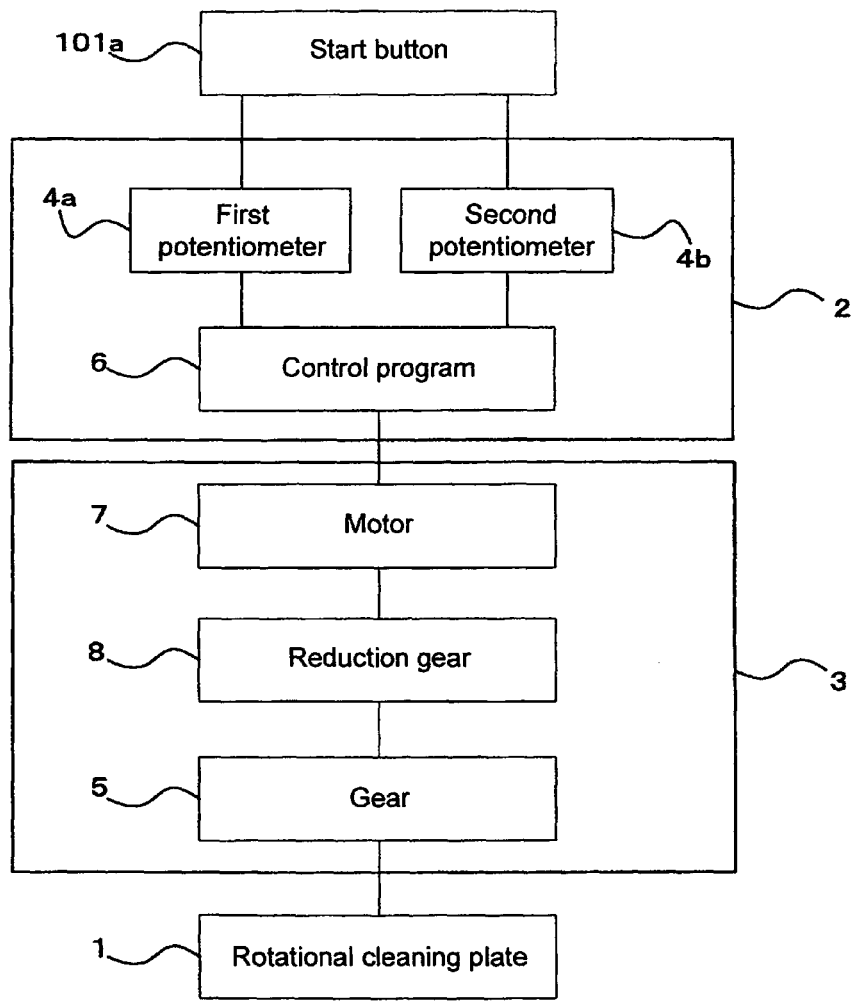
FIG. 5 is a block diagram illustrating the functions of controlling the position of the cleaning unit when the projection type display device shown in FIG. 4 is started up.

Control unit 2 includes control program 6 that controls the driving of drive unit 3 (see FIG. 5, etc.). Control program 6 includes initial position data that is first correlation data containing the corresponding first and second detected values, wherein the first correlation data are obtained when cleaning unit 1a is placed at the initial position. In addition, the initial position data may be stored on another recording medium or the like, separated from control program 6.

In this lens cleaning mechanism, control program 6 drives drive unit 3 during the standby state such that the second detected value of second potentiometer 4b is a value in accordance with the initial position data with respect to the first detected value of first potentiometer 4a. Accordingly, in this lens cleaning mechanism, cleaning unit 1a of rotational cleaning plate 1 is placed at the initial position during the standby state.

Moreover, even when control program 6 does not include the initial position data, it is sufficient that control program 6 comprises an initial position program that is a first correlation program for calculating the second detected value from the first detected value in accordance with the correspondence rule between the first and second detected values, wherein the correspondence rule is obtained when cleaning unit 1a is placed at the initial position. In addition, the initial position program may be stored on another recording medium, separated from control program 6.

Under these circumstances, in this lens cleaning mechanism, control program 6 drives drive unit 3 during the standby state such that the second detected value of second potentiometer 4b is a value calculated from the first detected value of first potentiometer 4a by the initial position program. Accordingly, in this lens cleaning mechanism, cleaning unit 1a of rotational cleaning plate 1 is placed at the initial position during the standby state.

Figure 4:
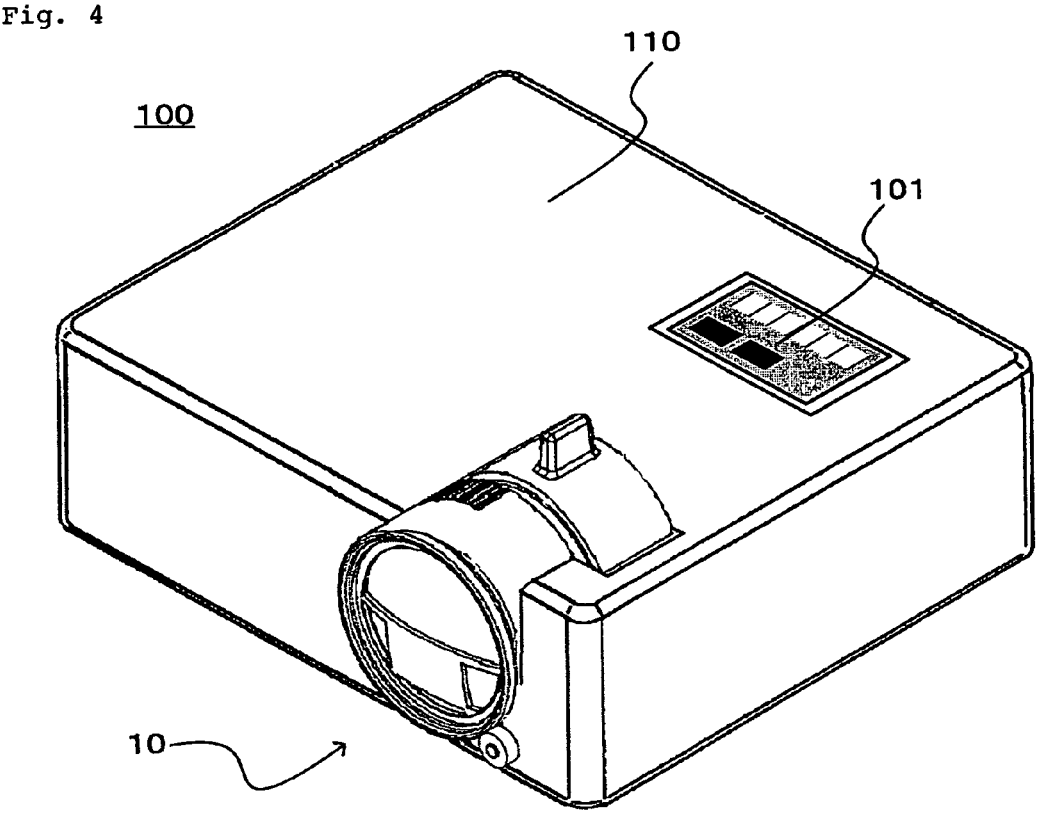
FIG. 4 is a perspective view of a projection type display device having the projection lens shown in FIG. 1.

FIG. 4 is a perspective view of a projection type display device having the projection lens shown in FIG. 1. Projection type display device 100 comprises projection lens 10 disposed on the front surface side, case 110, and operating unit 101 disposed on the top side of case 110, wherein case 110 houses a light source (not shown), an optical engine (not shown), or the like. Operating unit 101 is provided with operating buttons for executing the functions of the projection type display device including a start button, end button, cleaning button, etc.

FIG. 5 is a block diagram illustrating the functions of controlling the position of the cleaning unit when the projection type display device shown in FIG. 4 is powered on.

When start button 101a disposed on operating unit 101 of projection type display device 100 is pressed, the lens cleaning mechanism according to this embodiment is put into the standby state. When this lens cleaning mechanism is put into the standby state, control unit 2 drives drive unit 3 to place cleaning unit 1a at the initial position.

In control unit 2, first, first potentiometer 4a and second potentiometer 4b output detected values that correspond to the rotational positions of focus ring 14 and cleaning unit 1a. Subsequently, control program 6 drives drive unit 3 based on the detected values outputted by first potentiometer 4a and second potentiometer 4b. In drive unit 3, the drive force by motor 7 is transferred to gear 5 through reduction gear 8 for rotating gear 5. Accordingly, gear 5 rotates rotational cleaning plate 1 to place cleaning unit 1a at the initial position.

Figure 6:
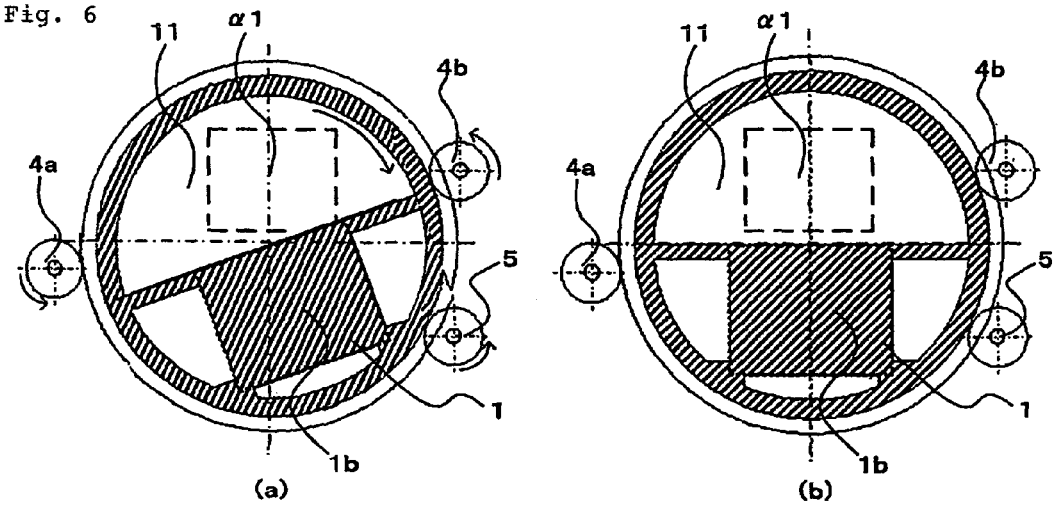
FIGS. 6(a) and 6(b) show diagrams illustrating the operations of controlling the position of the cleaning unit when the lens cleaning mechanism according to this embodiment is in a standby state.

FIG. 6 shows diagrams illustrating the operations of controlling the position of the rotational cleaning plate when the lens cleaning mechanism according to this embodiment is in the standby state. FIG. 6(a) shows the state in which cleaning unit 1a is shifted from the initial. position. In a case like this, when this lens cleaning mechanism is put into the standby state, gear 5 is rotated counterclockwise based on the detected values outputted by first potentiometer 4a and second potentiometer 4b. Accordingly, gear 5 rotates rotational cleaning plate 1 clockwise and places cleaning unit 1a at the initial position as shown in FIG. 6(b).

In the state as shown in FIG. 6(a), rotational cleaning plate 1 obstructs a part of image light passing area α1 on the surface of front lens element 11, through which optical path α of projection lens 10 passes (see FIG. 2). Because of this, when an image is projected in this state, a problem arises such that a part of the image that is obstructed by rotational cleaning plate 1 is not shown. However, since the cleaning mechanism according to this embodiment is configured such that cleaning unit 1a is placed at the initial position during the standby state, preventing the occurrence of a problem like this is possible.

Figure 7:
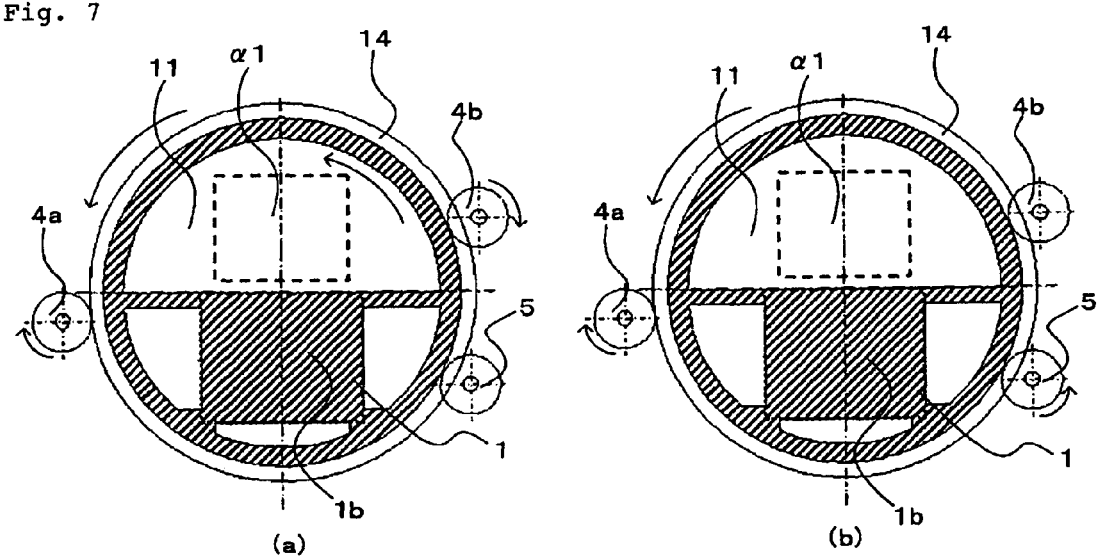
FIGS. 7(a) and 7(b) show diagrams illustrating the operations of controlling the position of the cleaning unit when the lens cleaning mechanism according to this embodiment is in the standby state.

FIG. 7 shows diagrams illustrating the operations during a rotational operation of the focus ring when the lens cleaning mechanism according to this embodiment is in the standby state. First, as shown in FIG. 7(a), when focus ring 14 is rotationally operated and focus ring 14 starts to rotate counterclockwise, rotational cleaning plate 1 held by focus ring 14 also starts to rotate counterclockwise together with focus ring 14.

Then, gear 5 rotates rotational cleaning plate 1 so as to place cleaning unit 1a at the initial position based on the detected values outputted by first potentiometer 4a and second potentiometer 4b. More specifically, gear 5 rotates rotational cleaning plate 1 such that the rotation of focus ring 14 and the rotation of rotational cleaning plate 1 are canceled by each other.

Accordingly, in the lens cleaning mechanism according to this embodiment, as shown in FIG. 7(b), cleaning unit 1a does not substantially move from the initial position, and keeps remaining at the initial position during the standby state. Consequently, although rotational cleaning plate 1 is held by focus ring 14, it is possible to prevent the occurrence of such an event in which focus ring 14 is rotationally operated to cause cleaning unit 1a to move from the initial position to a position in which image light passing area α1 is obstructed.

Figure 8:
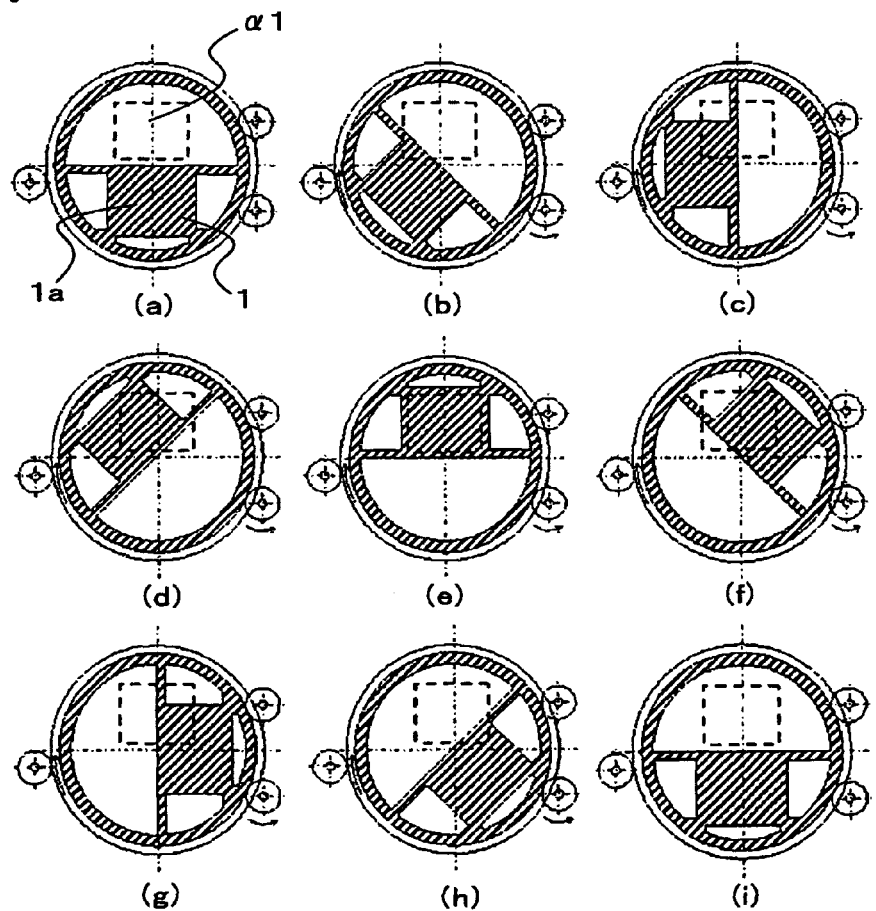
FIGS. 8(a)-8(i) show diagrams illustrating the operations during a cleaning operation of the lens cleaning mechanism according to this embodiment.

FIG. 8 shows diagrams illustrating the operations during the cleaning operation of the lens cleaning mechanism according to this embodiment.

FIGS. 8(a) to 8(i) show the processes from the state shown in FIG. 8(a) in which cleaning unit 1a is placed at the initial position to the state shown in FIG. 8(i) in which cleaning unit 1a makes a turn and is again placed at the initial position after rotational cleaning plate 1 is rotated at an angle of 45° for each 45° rotation at which the cleaning operation of this lens mechanism is performed.

In the lens cleaning mechanism according to this embodiment, during the processes in which rotational cleaning plate 1 makes a turn, cleaning unit 1a passes over the entire area of image light passing area α1. As a result, when rotational cleaning plate 1 is rotated, cleaning unit 1a wipes away dust particles or the like adhering in the entire area of image light passing area α1.

Figure 9:
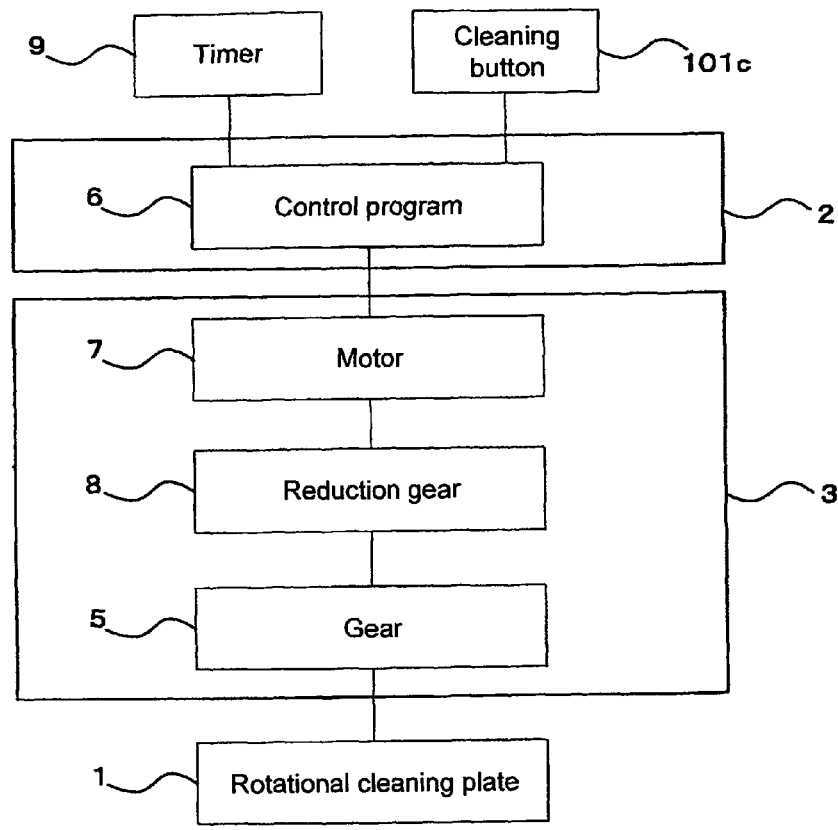
FIG. 9 is a block diagram illustrating the functions during the cleaning operation of the lens cleaning mechanism according to this embodiment.

FIG. 9 is a block diagram illustrating the functions during the cleaning operation of the lens cleaning mechanism according to this embodiment.

The lens cleaning mechanism according to this embodiment comprises timer 9 that measures and outputs a waiting time period. Every time when a time period, for which this lens cleaning, mechanism waits, reaches a preset time period in timer 9, a cleaning signal is inputted into control unit 2. In the lens cleaning mechanism according to this embodiment, a set time period for timer 9 is 500 hours.

Moreover, operating unit 101 of projection type display device 100 is provided with cleaning button 101c that is a switch to give instructions for the cleaning operation. When cleaning button 101c is pressed, a cleaning signal is inputted into control unit 2.

When the cleaning signal is inputted into control unit 2, control program 6 drives drive unit 3 for the cleaning operation of this lens cleaning mechanism. In drive unit 3, the drive force by motor 7 is transferred to gear 5 through reduction gear 8 for rotating gear 5. Accordingly, gear 5 rotates rotational cleaning plate 1. The number of times and the period of time during which rotational cleaning plate 1 is rotated in a single cleaning operation, are set in advance. In the lens cleaning mechanism according to this embodiment, the number of turns is set to six turns, and the rotating time period for two seconds.

Figure 10:
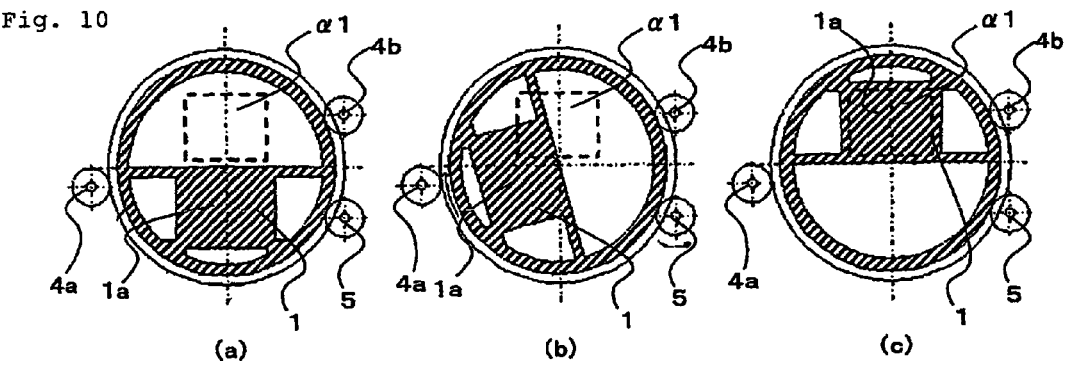
FIGS. 10(a)-10(c) show diagrams illustrating the operations of controlling the position of the cleaning unit when the projection type display device shown in FIG. 4 is finished.

FIG. 10 shows diagrams illustrating the operations of the rotational cleaning plate when use of the projection type display device shown in FIG. 4 is finished. In this lens cleaning mechanism, at the time when use of projection type display device 100 is finished and at the time when the device is put into the unused state, as shown in FIG. 10(a), rotational cleaning plate 1, in which cleaning unit 1a is placed at the initial position during the standby state, is rotated clockwise at an angle of 180°, and as shown in FIG. 10(c), cleaning unit 1a is placed at an unused position that is a second position at which cleaning unit 1a covers the entire area of image light passing area α1. Consequently, in this lens cleaning mechanism, during a non-passing state in which projection type display device 100 is not used and in which the image light does not pass through front lens element 11, image light passing area α1 on the surface of front lens element 11 is covered and protected with cleaning unit 1a. In this way, it is possible to prevent dust particles or the like from adhering to image light passing area α1, and to prevent damage thereto.

Control program 6 (see FIG. 11, etc.) includes unused position data that is second correlation data containing the corresponding first and the second detected value, wherein the second correlation data are obtained when cleaning unit 1a is placed at the unused position. In addition, the unused position data may be stored on another recording medium or the like, separated from control program 6.

In this lens cleaning mechanism, control program 6 drives drive unit 3 during finishing such that the second detected value of second potentiometer 4b is a value in accordance with the unused position data with respect to the first detected value of first potentiometer 4a. Accordingly, in this lens cleaning mechanism, cleaning unit 1a of rotational cleaning plate 1 is placed at the unused position during the standby state.

Moreover, even when control program 6 does not include the unused position data, it is sufficient that control program 6 comprises an unused position program that is a second correlation program for calculating the second detected value from the first detected value in accordance with the correspondence rule between the first and second detected values, wherein the correspondence rule is obtained when cleaning unit 1a is placed at the unused position. In addition, the unused position program may be stored on another recording medium, separated from control program 6.

Under these circumstances, in this lens cleaning mechanism, control program 6 drives drive unit 3 during finishing such that the detected value of second potentiometer 4b is a value calculated from the detected value of first potentiometer 4a by the unused position program. Accordingly, in this lens cleaning mechanism, cleaning unit 1a of rotational cleaning plate 1 is placed at the unused position during finishing.

Figure 11:
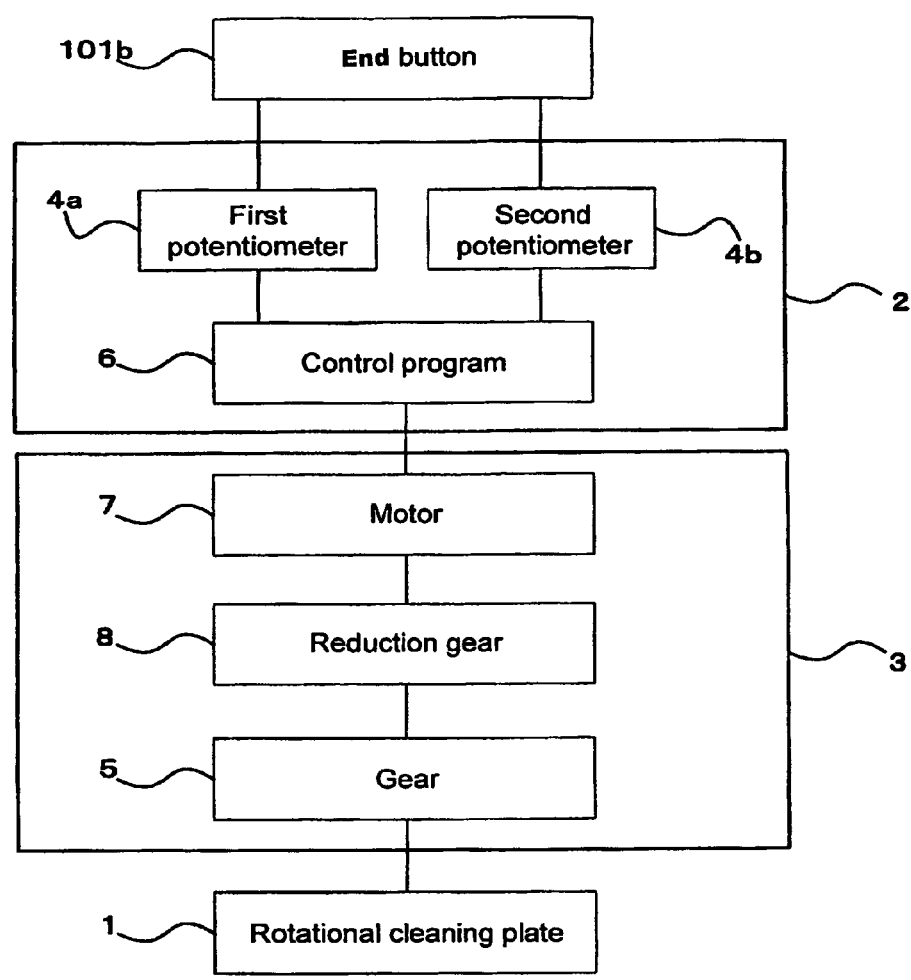
FIG. 11 is a block diagram illustrating the functions of controlling the position of the cleaning unit when the projection type display device shown in FIG. 4 is finished.

FIG. 11 is a block diagram illustrating the functions of controlling the position of the rotational cleaning plate when use of the projection type display device shown in FIG. 4 is finished.

When end button 101b disposed on operating unit 101 of projection type display device 100 is pressed in order to finish projecting images, the lens cleaning mechanism according to this embodiment activates the finishing operation. In this lens cleaning mechanism, control unit 2 drives drive unit 3 to place cleaning unit 1a at the unused position according to the finishing operation.

In control unit 2, first, first potentiometer 4a and second potentiometer 4b output detected values that correspond to the rotational positions of focus ring 14 and cleaning unit 1a. Subsequently, control program 6 drives drive unit 3 based on the detected values outputted by first potentiometer 4a and second potentiometer 4b. In drive unit 3, the drive force by motor 7 is transferred to gear 5 through reduction gear 8 for rotating gear 5. Accordingly, gear 5 rotates rotational cleaning plate 1 at an angle of 180° to place cleaning unit 1a at the unused position.

In addition, the shape of the cleaning unit of the lens cleaning mechanism according to this embodiment is not limited to the shape shown in FIG. 1, etc. In the following, lens cleaning mechanisms according to variations of this embodiment will be described, in which the shapes of the cleaning unit are modified.

When the shape of the cleaning unit is modified such that the area of the cleaning unit that passes over image light passing area α1 during the cleaning operation is increased, improving the performance of removing dust particles or the like adhering in image light passing area α1 is possible. On the other hand, in the case in which the cleaning operation is performed during the projection of images, images become dark during the cleaning operation because the area of the cleaning unit that obstructs image light passing area α1 is large.

Contrary to this, when the shape of the cleaning unit is modified such that the area of the cleaning unit that passes over image light passing area α1 during the cleaning operation is decreased, controlling the event in which images become dark during the cleaning operation is possible because the area of the cleaning unit that obstructs image light that passes area α1 is small in the case in which the cleaning operation is performed during the projection of images. On the other hand, the performance of removing dust particles or the like adhering in image light passing area α1 drops.

Consequently, the shapes of the cleaning unit can be modified to provide the performance required to remove dust particles or the like that is necessary for the lens cleaning mechanism and to provide the brightness of images required for projecting images.

Figure 12:
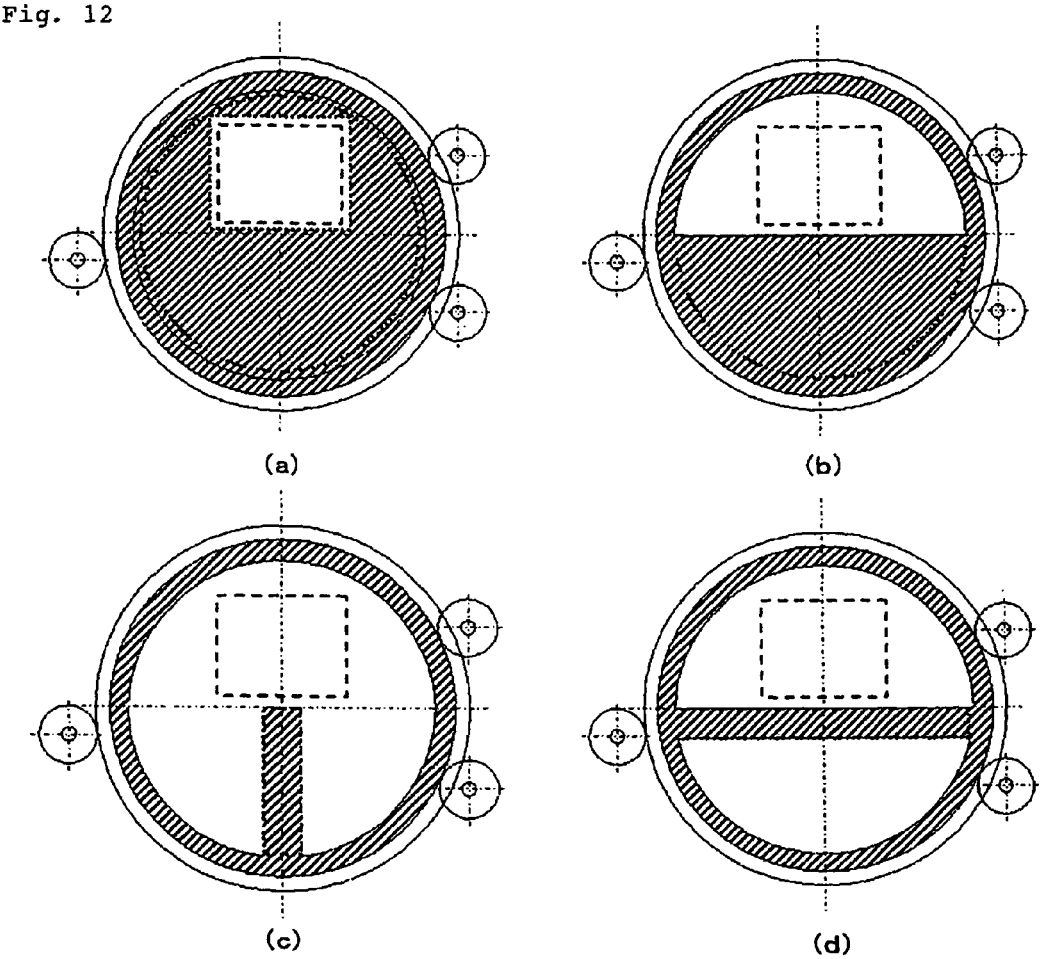
FIGS. 12(a)-12(d) show variations of the lens cleaning mechanism according to this embodiment.

FIG. 12 shows variations of the lens cleaning mechanism according to this embodiment. FIGS. 12(a) to 12(d) show the states in which the cleaning unit is placed at the initial position.

FIGS. 12(a) and 12(b) are diagrams illustrating lens cleaning mechanisms in which the areas of the cleaning units that cover the lens surface are increased compared to the lens cleaning mechanism according to this embodiment.

In the lens cleaning mechanism shown in FIG. 12(a), the cleaning unit covers the entire area, other than image light passing area α1 on the lens surface. In this lens cleaning mechanism, the area of the cleaning unit that covers the lens surface is increased to a maximum. For example, this is suited for cases in which no inconvenience is caused by images that temporarily become dark during the cleaning operation and there is a need for high performance in the removal of dust particles or the like.

In the lens cleaning mechanism shown in FIG. 12(b), the cleaning unit covers the entire area of the lower half of the lens surface. In this lens cleaning mechanism, the area of the cleaning unit to be placed on the lens surface is increased compared to the lens cleaning mechanism according to this embodiment. This is suited for cases in which there is a need for high performance in the removal of dust particles or the like and a need for controlling images that become dark during the cleaning operation.

FIGS. 12(c) and 12(d) are diagrams illustrating lens cleaning mechanisms in which the areas of the cleaning units to be placed on the lens surface are decreased compared to the lens cleaning mechanism according to this embodiment.

In the lens cleaning mechanism shown in FIG. 12(c), a rod-shaped cleaning unit is disposed from the center part of the lens surface to a holding member. In this lens cleaning mechanism, the area of the cleaning unit to be placed on the lens surface is decreased to a minimum. For example, this is suited for cases in which it is desirable to minimize as much as possible the reductions in the brightness of images during the cleaning operation whereas the performance of removing dust particles or the like may not so high.

In the lens cleaning mechanism shown in FIG. 12(d), a rod-shaped cleaning unit is placed along the direction of the diameter of a ring-shaped holding member and both end portions thereof are held by the holding member. Consequently, in this lens cleaning mechanism, a small pressing force of the cleaning unit against the lens surface does not tend to occur on the surface. As a result, in this lens cleaning mechanism, a reduction in the occurrences of variations in wipes on the lens surface is possible.

In this lens cleaning mechanism, although the area of the cleaning unit that covers the lens surface is larger compared to the lens cleaning mechanism shown in FIG. 12(c), the area of the cleaning unit to be placed on the lens surface is decreased to the minimum size in order to achieve a configuration that can reduce the occurrences of variations in wipes on the lens surface. Consequently, this lens cleaning mechanism is suited for cases in which it is desirable to reduce the occurrences of variations in wipes on the lens surface and to minimize as much as possible the reductions in the brightness of images during the cleaning operation.

Moreover, in the case in which the lens cleaning mechanism according to this embodiment is adapted to projection lenses having a holding frame that cannot be rotationally operated, it is unnecessary to control the position of rotational cleaning plate 1 in relation to the rotational position of the holding frame. Consequently, in a case like this, it is unnecessary that control unit 2 be provided with first potentiometer 4a that is the holding frame detecting unit and with second potentiometer 4b that is the cleaning unit detecting unit.

Furthermore, the lens cleaning mechanism according to this embodiment, holding unit 1b of rotational cleaning plate 1 is slid with respect to focus ring 14 to rotationally move cleaning unit 1a over the lens surface. However, the cleaning unit may be configured to be rotationally moved by other mechanisms. For example, such a configuration may be possible in which the cleaning unit is supported by a support disposed on the outside of the focus ring and the cleaning unit is rotationally moved over the lens surface by a drive motor connected to the support.

In addition, the lens cleaning mechanism according to this embodiment is adapted to projection type display devices. However, other than projection type display devices, the lens cleaning mechanism is adaptable to such devices in which a lens is included and no inconvenience is caused by the cleaning unit covering a part of the lens surface during use of the device. Such devices, for example, include imaging devices such as cameras.

The invention claimed is:

1. A projection type display device comprising a projection lens for emitting image light incident thereto, the projection lens comprising a lens cleaning mechanism for cleaning a surface of a lens element of the projection lens, the lens cleaning mechanism comprising:

a cleaning unit configured to be pressed against and cover a standby area comprising a part of the surface of the lens element other than an image light passing area through which the image light passes, the cleaning unit being rotationally moved along the surface of the lens element to slide over an entirety of the surface of the lens element, including a remaining part of the surface of the lens element and the standby area;

a drive unit connected to a holding member;

a control unit configured to rotationally move the cleaning unit by driving the drive unit when the control unit receives a cleaning signal; and an operating unit configured to be operated to input the cleaning signal to the control unit, wherein the lens cleaning mechanism performs a cleaning operation by the control unit rotationally moving the cleaning unit such that the cleaning unit passes over the image light passing area, wherein, during a standby state while waiting for the cleaning operation to be performed, the control unit places the cleaning unit at a first position at which the cleaning unit covers the standby area, wherein the projection lens further comprises a rotationally operable holding frame holding the lens element and the cleaning unit, and wherein, during the standby state, the control unit places the cleaning unit at the first position by using detected values corresponding to a rotational position of the holding frame and a rotational position of the cleaning unit.

2. The projection type display device according to claim 1, wherein the control unit rotationally moves the cleaning unit when a time period for the waiting reaches a set time period.

3. The projection type display device according to claim 1, wherein the projection lens projects images on a screen by said emitting the image light.

4. The projection type display device according to claim 3, further comprising:
a rear lens element located in a rearmost part of the projection type display device,
wherein the rear lens element emits the images to the projection lens that is located in a front part of the projection type display device.

5. The projection type display device according to claim 1, wherein the rotationally operable holding frame comprises a focus ring that adjusts images that are projected from the projection lens.

6. A projection type display device comprising a projection lens for emitting image light incident thereto, the projection lens comprising a lens cleaning mechanism for cleaning a surface of a lens element of the projection lens, the lens cleaning mechanism comprising:
a cleaning unit configured to be pressed against and cover a standby area comprising a part of the surface of the lens element other than an image light passing area through which the image light passes, the cleaning unit being rotationally moved along the surface of the lens element to slide over an entirety of the surface of the lens element, including a remaining part of the surface of the lens element and the standby area;
a drive unit connected to a holding member;
a control unit configured to rotationally move the cleaning unit by driving the drive unit when the control unit receives a cleaning signal; and
an operating unit configured to be operated to input the cleaning signal to the control unit,
wherein the lens cleaning mechanism performs a cleaning operation by the control unit rotationally moving the cleaning unit such that the cleaning unit passes over the image light passing area,
wherein, during a standby state while waiting for the cleaning operation to be performed, the control unit places the cleaning unit at a first position at which the cleaning unit covers the standby area,
wherein the projection lens further comprises a rotationally operable holding frame holding the lens element and the cleaning unit,
wherein the control unit comprises a holding frame detecting unit configured to output a first detected value corresponding to a rotational position of the holding frame and a cleaning unit detecting unit configured to output a second detected value corresponding to a rotational position of the cleaning unit, and
wherein, during the standby state, the control unit places the cleaning unit at the first position by using the first detected value and the second detected value.

7. The projection type display device according to claim 6, wherein during the standby state, the control unit places the cleaning unit at the first position by driving the drive unit such that the second detected value to be outputted from the cleaning unit detecting unit is a value corresponding to the first detected value outputted from the holding frame detecting unit, in accordance with correlation data containing the corresponding first and second detected value, the correlation data being obtained when the cleaning unit is placed at the first position.

8. The projection type display device according to claim 6, wherein during the standby state, the control unit places the cleaning unit at the first position by driving the drive unit such that the second detected value to be outputted from the cleaning unit detecting unit is a value calculated from the first detected value outputted from the holding frame detecting unit by using a correlation program for calculating the second detected value from the first detected value, in accordance with a correspondence rule between the first and second detected value, the correspondence rule being obtained when the cleaning unit is placed at the first position.

9. A projection type display device comprising a projection lens for emitting image light incident thereto, the projection lens comprising a lens cleaning mechanism for cleaning a surface of a lens element of the projection lens, the lens cleaning mechanism comprising:
a cleaning unit configured to be pressed against and cover a standby area comprising a part of the surface of the lens element other than an image light passing area through which the image light passes, the cleaning unit being rotationally moved along the surface of the lens element to slide over an entirety of the surface of the lens element, including a remaining part of the surface of the lens element and the standby area;
a drive unit connected to a holding member;
a control unit configured to rotationally move the cleaning unit by driving the drive unit when the control unit receives a cleaning signal; and
an operating unit configured to be operated to input the cleaning signal to the control unit,
wherein the lens cleaning mechanism performs a cleaning operation by the control unit rotationally moving the cleaning unit such that the cleaning unit passes over the image light passing area,
wherein, during a standby state while waiting for the cleaning operation to be performed, the control unit places the cleaning unit at a first position at which the cleaning unit covers the standby area,
wherein the projection lens further comprises a rotationally operable holding frame holding the lens element and the cleaning unit,
wherein the control unit allows the cleaning unit to move between the first position and a second position at which the cleaning unit covers the image light passing area, and
wherein, during a non-passing state in which the image light does not pass through the image light passing area, the control unit places the cleaning unit at the second position,
wherein the control unit comprises a holding frame detecting unit configured to output a first detected value corresponding to a rotational position of the holding frame and a cleaning unit detecting unit configured to output a second detected value corresponding to a rotational position of the cleaning unit, and
wherein the control unit places the cleaning unit at the first position during the standby state, and places the cleaning unit at the second position during the non-passing state, by using the first detected value and the second detected value.

10. The projection type display device according to claim 9, wherein, during the standby state, the control unit places the cleaning unit at the first position by driving the drive unit such that the second detected value to be outputted from the cleaning unit detecting unit includes a value corresponding to the first detected value outputted from the holding frame detecting unit, in accordance with first correlation data containing the corresponding first and second detected value, the first correlation data being obtained when the cleaning unit is placed at the first position, and wherein, during the non-passing state, the control unit places the cleaning unit at the second position by driving the drive unit such that the second detected value to be outputted from the cleaning unit detecting unit is a value corresponding to the first detected value outputted from the holding frame detecting unit, in accordance with second correlation data containing the first and second detected value, the second correlation data being obtained when the cleaning unit is placed at the second position.

11. The projection type display device according to claim 9, wherein, during the standby state, the control unit places the cleaning unit at the first position by driving the drive unit such that the second detected value to be outputted from the cleaning unit detecting unit includes a value calculated from the first detected value outputted from the holding frame detecting unit by using a first correlation program for calculating the second detected value from the first detected value, in accordance with a correspondence rule between the first and second detected value, the correspondence rule being obtained when the cleaning unit is placed at the first position, and wherein during the non-passing state, the control unit places the cleaning unit at the second position by driving the drive unit such that the second detected value to be outputted from the cleaning unit detecting unit is a value calculated from the first detected value outputted from the holding frame detecting unit by using a second correlation program for calculating the second detected value from the first detected value, in accordance with a correspondence rule between the first and second detected value, the correspondence rule when the cleaning unit is placed at the second position.

* * * * *